United States Patent [19]

Jaszka et al.

[11] 4,216,195

[45] Aug. 5, 1980

[54] PRODUCTION OF CHLORINE DIOXIDE HAVING LOW CHLORINE CONTENT

[75] Inventors: Daniel J. Jaszka, Tonawanda; Harold D. Partridge, Wilson, both of N.Y.

[73] Assignee: Hooker Chemicals & Plastics Corp., Niagara Falls, N.Y.

[21] Appl. No.: 907,432

[22] Filed: May 19, 1978

[51] Int. Cl.$^2$ ............................................. C01B 11/02
[52] U.S. Cl. .................................. 423/478; 423/241; 423/475; 423/499
[58] Field of Search ................. 423/241, 475, 477–480, 423/499; 55/71

[56] References Cited

U.S. PATENT DOCUMENTS

| | | | |
|---|---|---|---|
| 2,036,311 | 4/1936 | White | 423/499 |
| 2,731,329 | 1/1956 | Kamlet | 423/507 |
| 2,863,722 | 12/1958 | Rapson | 423/478 |
| 2,963,219 | 5/1960 | Rapson | 423/478 |
| 3,056,656 | 10/1962 | Nicolaisen | 423/475 |
| 3,823,225 | 7/1974 | Sprague | 423/475 |
| 3,920,801 | 11/1975 | Grotheer | 423/475 |

OTHER PUBLICATIONS

Sconce, "Chlorine–Its Manufacture, Properties & Uses", Reinhold Publishing Corp., New York, 1967, p. 538.

Primary Examiner—Earl C. Thomas
Attorney, Agent, or Firm—Peter F. Casella; William G. Gosz

[57] ABSTRACT

The proportion of chlorine dioxide to chlorine in aqueous solutions formed from gaseous mixtures of chlorine dioxide and chlorine is improved over conventional separation techniques. The gaseous product stream from a chlorine dioxide generator is scrubbed with an aqueous salt mixture containing an approximately stoichiometric quantity of sodium hydroxide, which reacts preferentially with the chlorine, yielding chlorine dioxide of high purity. The absorption system is operated under such conditions that the chlorine is converted to sodium chlorate and sodium chloride, which may then be recirculated to the chlorine dioxide generating system. The scrubbing salt solution is adjusted so as to produce an R-2 mixture upon reaction with the chlorine in the chlorine/chlorine dioxide stream.

7 Claims, 1 Drawing Figure

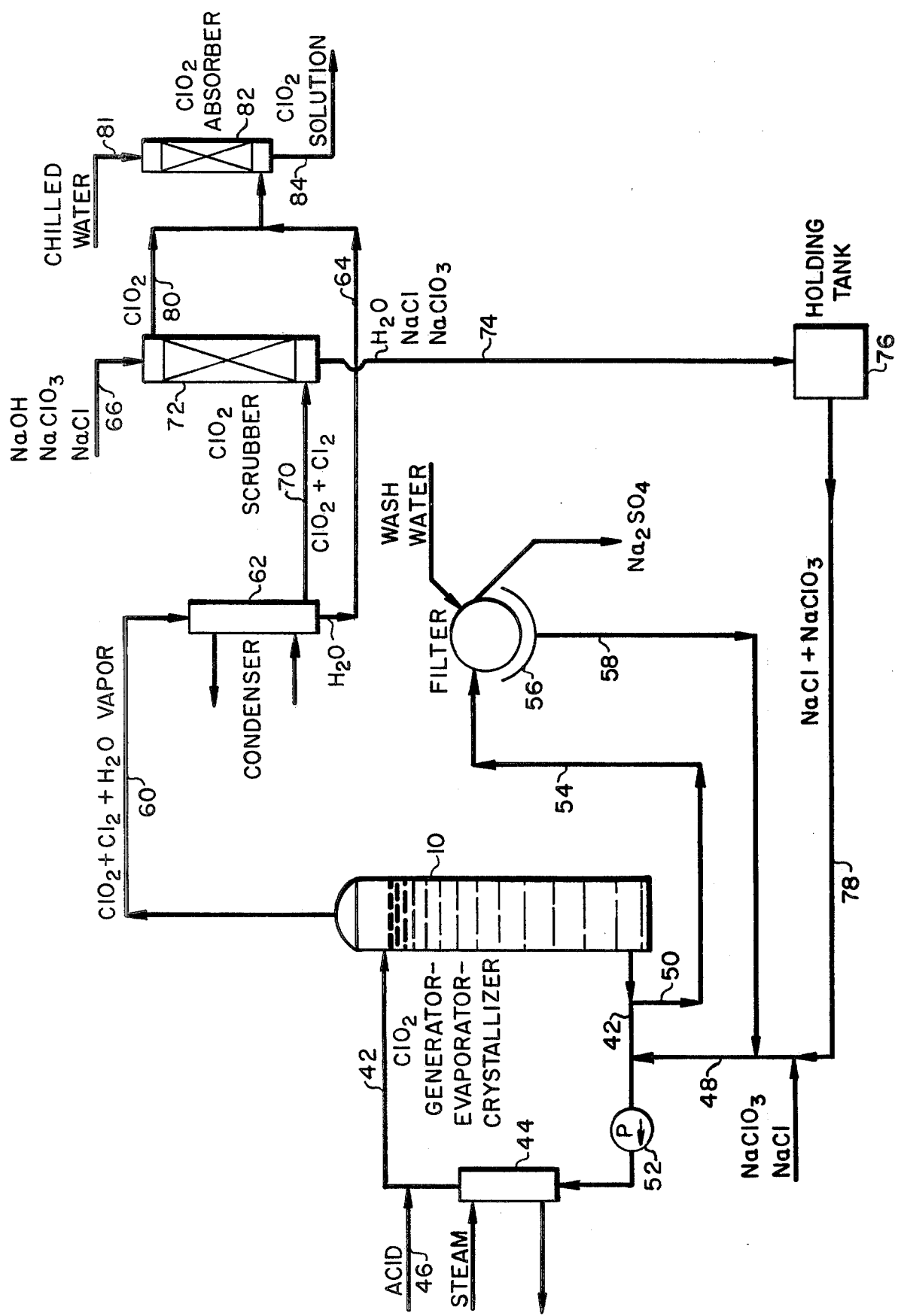

PRODUCTION OF CHLORINE DIOXIDE HAVING LOW CHLORINE CONTENT

BACKGROUND OF THE INVENTION

Chlorine dioxide, which is used in bleaching operations such as the bleaching of cellulosic fibers, may be produced in a variety of manners, generally involving reduction of chlorate by chloride in the presence of an acid. The chlorine dioxide normally is used in the form of an aqueous solution. In as much as chlorine dioxide is of considerable commercial interest and importance in such areas as pulp bleaching, as indicated above, water purification, fat bleaching, removal of phenols from industrial waste, textile bleaching and the like, it is desirable to provide processes by which the chlorine dioxide may be economically produced, and the amount of chlorine produced therewith may be controlled. The basic reaction involved in conventional processes is summarized by the equation:

$$ClO_3^- + Cl^- + 2H^+ \rightarrow ClO_2 + \tfrac{1}{2}Cl_2 + H_2O$$

Commonly, formation of chlorine dioxide involves the reduction of an alkali metal chlorate with alkali metal chloride in an acid medium. The reactions which occur are exemplified below. For the sake of illustration, the chlorate used is sodium chlorate, the chloride used is sodium chloride, and the strong acid used is sulfuric acid:

$$NaClO_3 + NaCl + H_2SO_4 \rightarrow ClO_2 + \tfrac{1}{2}Cl_2 + Na_2SO_4 + H_2O$$

An alternative process involves the reduction of the chlorate by hydrochloric acid, the hydrochloric acid providing both the reductant and the acid medium. This process, wherein the alkali metal is sodium, is exemplified by the equation:

$$NaClO_3 + 2HCl \rightarrow ClO_2 + \tfrac{1}{2}Cl_2 + H_2O + NaCl$$

Such reactions are employed commercially, with the reactants continuously fed into a reaction vessel and the chlorine and chlorine dioxide produced therein continuously removed from the reaction vessel.

A single vessel process for producing chlorine dioxide is set forth in U.S. Pat. No. 3,563,702, the teachings of which are hereby incorporated by reference, wherein alkali metal chlorate, an alkali metal chloride and a mineral acid solution are continuously fed to a single vessel generator-evaporator-crystallizer in proportions sufficient to generate chlorine dioxide and chlorine, at a temperature of from about 50° to about 100° centigrade, and an acidity of from about 2 to higher than about 5 normal, in the presence of a catalyst, or at about 4–12 normal without catalyst, removing water by vacuum induced evaporation at about 100-140 millimeters of mercury absolute, with concurrent withdrawal of chlorine dioxide and chlorine, crystallizing the salt of the mineral acid within the generator and withdrawing the crystals from the vessel. Such a system is commercially available, under the trade designation SVP ® Process, from Hooker Chemicals & Plastics Corp.

As the reaction occurs within the generator, in reactions where sulfuric acid is employed as a mineral acid reactant, crystals of sodium sulfate and sodium acid sulfate in amounts and presence dependent generally upon the acid concentration used, are crystallized out and settle to the bottom of the generator from whence they are withdrawn in the form of a slurry.

In addition to the use of sulfuric acid, hydrochloric acid can also be used as the mineral acid reactant, in which instance the crystals removed from the generator are alkali metal chloride crystals, which product is often less desirable than alkali metal sulphate. Sodium sulphate is a valuable by-product, useful in kraft pulping operations, as is the chlorine dioxide. Therefore, systems producing chlorine dioxide and sodium sulfate are particularly useful inasmuch as on-site co-ordination can be effected with pulping operations, utilizing both the primary chlorine dioxide product and the recovered sodium sulfate in the pulping process, particularly in kraft mill operations.

In some instances, however, the requirement for sodium sulfate is greatly reduced or obviated. In certain types of pulping process, sodium sulfate is not required. In certain kraft mill operations, the requirements for sodium sulfate may be reduced or varied, and the disposal of excess salt produces problems, in view of environmental protection standards presently in force. While the requirement for reduced quantities of sodium sulfate may vary, the requirement for the chlorine dioxide remains.

In such instances where reduced quantities or no sodium sulfate is required, the single vessel process can be converted to utilize hydrochloric acid as the mineral acid reactant, in which instance the by-product is sodium chloride. However, such systems are not as efficient as the systems employing sulfuric acid. Further, only sodium chloride is produced and in those instances where varying quantities of sodium sulfate are required, to generate the required amount of sodium sulfate would necessitate the switching back and forth from a catalyzed sulfuric acid system to a catalyzed hydrochloric acid system, with all the problems attendant thereto.

The present invention may be utilized in any conventional chlorine dioxide generating process utilizing a chloride reducing agent, wherein chlorine is concurrently produced. Exemplary systems include the SVP ® II Process, available from Hooker Chemicals & Plastics Corp., as well as the R-2 Process described in U.S. Pat. Nos. 2,863,722, issued Dec. 9, 1958 and 2,936,219 issued May 10, 1960, and the Kesting Process described in *Chlorine—Its Manufacture, Properties and Uses*, J. S. Sconce, 1967 at page 538. It may be seen that such commercial processes conventionally produce a mixture of chlorine dioxide and chlorine. The advantage of using $ClO_2$ in place of $Cl_2$ in such uses as pulp bleaching is that is gives high brightness with little loss in fibrous strength. Presently, all existing commercial processes produce $Cl_2$ in varying quantities along with the $ClO_2$. There is a nominal separation in the $ClO_2$ scrubbers used in such plants, since $ClO_2$ is much more soluble than $Cl_2$ in water. The resultant effluent from the scrubber contains about 8 grams per liter $ClO_2$ and from 1.5 to 2 grams per liter $Cl_2$. Excess $Cl_2$ is recovered from the top of the scrubber and fed to a caustic scrubber. However, if excessive $Cl_2$ is contained in the $ClO_2$—$H_2O$ solution, pulp fiber strength is deleteriously affected. The one to two grams per liter of chlorine presently obtained is marginal from this consideration, and it would be desirable if a more effective separation of $ClO_2$ from $Cl_2$ were possible.

Various procedures for selectively removing $Cl_2$ from $ClO_2$ and vice versa have been utilized through the years. In 1936, U.S. Pat. No. 2,036,311 taught that oxides, hydroxides, and carbonates of alkaline or alkaline earth metals, in the presence of water, selectively absorbed $Cl_2$.

U.S. Pat. No. 2,078,045 taught that continued chlorination of calcium oxide resulted in formation of calcium chlorate, which when treated with HCl formed $ClO_2$.

U.S. Pat. No. 2,108,976 taught that when a $ClO_2$—$Cl_2$ gas mixture was bubbled through aqueous $H_2SO_4$, $Cl_2$ is selectively absorbed, which may be later recovered by air stripping. Similarly, when $ClO_2$—$Cl_2$ is bubbled through dilute aqueous HCl, $ClO_2$ is selectively absorbed.

U.S. Pat. No. 3,063,218 taught that $ClO_2$ is selectively absorbed from $Cl_2$ when contacted with silica gel at temperatures greater than 30° C., forming a stable mixture of chlorine dioxide and silica gel. The chlorine dioxide could be desorbed by increasing the temperature and stripping with air. Rapson et al. taught in U.S. Pat. No. 2,481,241 that $ClO_2$ could be purified by adding sufficient $SO_2$ to react with the $Cl_2$. Rapson also taught countercurrent reaction of $ClO_2$—$Cl_2$ gas mixtures with an equimolar solution of $NaClO_3$ and $NaClO_2$, in U.S. Pat. No. 2,871,097.

All of the proceeding processes would yield purified $ClO_2$. However, none appear to be practical from an operational or economical point of view. There is, at the present, no need to obtain pure $ClO_2$, nor is there need to eliminate $Cl_2$ production entirely. It is only necessary to reduce the present one to two grams per liter $Cl_2$ level in the $ClO_2$ solution presently obtained. Further, since the pulp mill operations commonly utilize $Cl_2$ in their bleaching operations, it would seem unnecessary to go to the expense of totally eliminating $Cl_2$ production.

SUMMARY OF THE INVENTION

It has now been found, in accordance with the present invention, that an efficient removal of chlorine from a gaseous mixture of chlorine and chlorine dioxide, may be achieved by countercurrent flowing of the gaseous mixture through a washing or scrubbing solution comprising sodium chlorate, sodium chloride, and sodium hydroxide. Most efficient use of this technique occurs when the ratio of the chlorate, chloride, and hydroxide, are such as to yield (after reaction with the chlorine in the gaseous mixture) a product stream approximating the composition of the R-2 feed to the chlorine dioxide generator. Ideal operating conditions also dictate a nearly neutral scrubbing solution, i.e., pH 6 to 8, and a temperature within the range of from about 60° to about 80° C., although temperatures between about 50° C. and about 100° C., and a pH from about 4 to about 9 may be useful. This invention provides a continuous, as opposed to batch, operation for the reduction of chlorine in a chlorine dioxide product stream, which operation consumes all of the caustic present in the scrubbing solution.

BRIEF DESCRIPTION OF DRAWING

The sole accompanying drawing is a schematic flow sheet illustrating aspects of the present invention.

DESCRIPTION OF PREFERRED EMBODIMENTS

In the drawing, 10 designates the chlorine dioxide reactor in general, which may be any suitable reactor for the preparation of chlorine dioxide. The illustrative chlorine dioxide reactor functions as a generator-evaporator-crystallizer, of the single vessel process variety. Connected to the reaction vessel 10 is a half loop reaction solution circulation conduit 42, which is equipped with a heat exchanger 44, acid inlet means 46, chlorate reactant inlet 48, which may also serve as the introduction site for a reducing agent such as an alkali metal chloride, outlet 50 for alkali metal salt crystal removal, and pump 52.

Reaction solution is continuously pumped through half loop 42, in which the conditions of reactant concentration and reaction solution temperature are controlled, and solid product is removed. The solid crystalline alkali metal sulphate slurry removed at outlet 50 is passed via conduit 54 to solid-liquid separator 56, which may be any known device, but is herein illustrated as a rotary filter. A cyclone separator (not shown) may be advantageously inserted in conduit 54 between filter 56 and outlet 50 to classify and thicken the solid alkali metal sulphate slurry before it is introduced into the filter. Thus, an amount of fines may be separated prior to filtration and, in combination with the filtrate and wash water from filter 56, returned via line 58 to inlet 48 of loop 42. In any event, the wash water and filtrate from filter 56 is returned via conduit 58 and half loop 42 to the main body of reaction solution in reactor 10. The product, neutral alkali metal sulphate ($Na_2SO_4$) is removed from filter 56.

The product vapor, containing up to about 10% chlorine dioxide, chlorine, and water vapor, exits reactor 10 via line 60 to condenser 62, wherein the water vapor is condensed and the chlorine dioxide/chlorine mixture is rapidly cooled to a temperature below its decomposition temperature. Condensate is removed from condenser 62 via line 64, and circulated to line 80 for feed to the absorber 82. In this manner, only gases are fed to the chlorine dioxide scrubber for treatment. Gaseous chlorine dioxide and chlorine leave condenser 62 via line 70 and are conducted to the lower region of chlorine dioxide scrubber 72. The chlorine in the gaseous mixture is reacted with the liquid countercurrently flowing sodium chloride/sodium chlorate/sodium hydroxide solution introduced via line 66, in accordance with the reaction:

$3Cl_2 + 6\ NaOH \rightarrow NaClO_3 + 5\ NaCl + 3H_2O$

The salt mixture provided through line 66 is so proportioned as to contain an approximately stoichiometric quantity of sodium hydroxide to react preferentially with the chlorine, yielding chlorine dioxide with minimal chlorine content. The ratio of sodium chlorate and sodium chloride present is so selected to provide a product stream composition which approximates the composition of the chlorate reactant fed to the reaction loop 42 through line 48. In addition, it is desirable to maintain the sodium chloride concentration near saturation (e.g. above about 75%, and preferably, above about 90% of the saturation concentration), so as to minimize solubility of chlorine dioxide in the scrubbing solution, while minimizing chlorate concentration to the extent necessary to avoid crystallization in the scrubber. The desired reaction is achieved by operation of the scrubbing system at a temperature in the range of from 60° to 80° C., with the pH of the scrubbing solution at a nearly neutral condition i.e., between pH 6 and pH 8, at which conditions the formation of chlorate from HOCl and NaOCl is maximized. A hold tank, 76, may be necessary to achieve complete conversion of $OCl^-$ to $ClO_3^-$. The reaction product of the scrubbing reaction exits scrubber 72 via line 74 to optional holding tank 76, and is then conducted via line 78 back to reaction solution circulation conduit 42. For sake of convenience, conduit 78 is illustrated as joining conduit 48, the chlorate reactant inlet, although it is understood that alternative arrangements are feasible.

The chlorine dioxide, now substantially stripped of gaseous chlorine, exits scrubber 72 via line 80 to $ClO_2$ absorber 82, where it is joined with water condensate from line 64. Chilled water is fed to the top of the absorber by line 81, and removed from the bottom of the absorber as chlorine dioxide solution, via line 84, for use.

Care must be exercised in the selection of salt solution proportions, so as to avoid problems of crystallization of sodium chlorate in the scrubber column. However, as previously indicated it is desired to set proportions of chlorate, chloride and hydroxide in the scrubbing solution so as to yield a product solution having the approximate composition of the initial reactant, i.e., the feed to the chlorine dioxide generator. Ideally, the reactant feed approximates the composition of an R-2 solution, comprising between about 0.7:1 to 5:1 chloride to chlorate ratio. Depending upon the activity of the reaction solution in the combination generator-evaporator-crystallizer utilized in the preferred embodiment, and the temperature of the reaction solution, the use of feed solutions wherein the molar ratio of chloride to chlorate is close to 0.7:1 or 5:1 may lead to the precipitation of sodium chlorate or sodium chloride respectively, which will be recovered along with the alkali metal salt of the acid employed. In addition, feeding a solution to the reactor having a chloride to chlorate ratio of less than 1:1 may require the addition of chloride to achieve efficient operation. This may be avoided by altering the composition of the feed solution. For the production of chlorine dioxide, the use of feed solutions having a molar ratio of the order of from 1.0:1 to 1.3:1 is preferred. In keeping with the above ratio, it is preferred that the acid normality of the feed reactant system be maintained at from about 3 to about 4, although it is even more preferred to maintain a normality of from about 3.4 to about 3.8. It is further preferred to maintain the chloride ion molarity at from about 0.5 to about 2, and chlorate ion molarity at from about 1 to 2.

In order to illustrate the invention, the following examples, which are not to be taken as a limitation upon the scope of the invention of the claims hereinafter, are presented.

EXAMPLES 1-4

A laboratory $ClO_2$ generator of the $NaClO_2$ type was utilized to yield a mixture of $ClO_2$, $Cl_2$, and air. This mixture was further diluted with approximately 2,100 cc. per minute of additional air. Gas mixture was passed into the bottom of a 5 inch high × $\frac{3}{8}$ inch diameter glass tower, packed with $\frac{1}{4}$ inch glass helices. Simultaneously, a hot solution of sodium chloride/sodium chlorate/sodium hydroxide was passed countercurrently downwardly through the glass tower to scrub the gas mixture. The composition of the gas feed was analyzed as to both chlorine and chlorine dioxide, both prior to and subsequent to scrubbing. In addition, the composition of the spent scrub solution was determined with respect to both NaClO and $NaClO_3$. In addition, the temperature of the scrub solution and the pH of the spent solution were measured. The results of these examples are illustrated in Table I, wherein improvements in the proportion of chlorine dioxide remaining in the scrubbed gas stream are clearly evident.

TABLE I

| Exp. No. | Scrub Solution Comp. | cc Solution Per Min. | Gases (grams/min.) IN Cl$_2$ | Gases (grams/min.) IN ClO$_2$ | Gases (grams/min.) OUT Cl$_2$ | Gases (grams/min.) OUT ClO$_2$ | Approx. Oper. Temp. °C. | GA % ClO$_2$ Before Scrubbing | GA % ClO$_2$ After Scrubbing | Spent Scrub Solution Comp. gpl NaClO*** | Spent Scrub Solution Comp. gpl NaClO$_3$ | pH |
|---|---|---|---|---|---|---|---|---|---|---|---|---|
| 3586-139 | A | 3.3-3.7 | .28 | .50 | .03 | .41 | 70 | 42-57 | 80-86 | 59 | ND | 12.2 |
| 3586-141 | B | 1.7 | .335 | .555 | .136 | .556 | 70-80 | 49 | 67 | 9.2 | 475* | 6.9-7.2 |
| 3586-142 | C | 1.3-3.7 | .20 | .45 | .02 | .36 | 70-80 | 54 | 90 | 2.3 | ND | 5.0-12.1 |
| 3586-143 | C | 3.5 | .20 | .45 | .02 | .33 | 70-80 | 54 | 88 | 3.0 | 356 | 6-6.8 |

| | | gpl NaClO$_3$ | gpl NaCl | gpl NaOH |
|---|---|---|---|---|
| Scrub Solution: | A | 340 | 85 | 119 |
| | B | 340 | 88 | 94 |
| | C | 283 | 71 | 78 |

*Considerable crystallization in column
**Diluted with air ~ 2100 cc/min.
***As available Cl$_2$
ND Not Determined

EXAMPLE V

A laboratory chlorine dioxide generator was utilized for the manufacture of chlorine dioxide and chlorine, as illustrated in Examples I–IV. Upon reaching equilibrium, the following product streams and approximate material balance resulted.

A gas stream containing 0.20 gram per minute of $Cl_2$ and 0.45 gram per minute of $ClO_2$ was contacted in the $ClO_2$ scrubber with 3.5 cc per minute of scrub solution comprising 283 grams per liter $NaClO_3$ (21.8%), 71 grams per liter NaCl (5.6%), 78 grams per liter NaOH (6.0%), and 868 grams per liter $H_2O$ (66.6%). The scrub solution thus provided 0.27 grams per minute of NaOH, 0.25 grams per minute of NaCl, 0.98 grams per minute $NaClO_3$, and 3.00 grams per minute of $H_2O$. Operating at a pH of 7 and at a temperature of 70°–80° C., the off-gas composition was 0.33 grams per minute $ClO_2$ and 0.02 grams per minute $Cl_2$, demonstrating a 90% $Cl_2$ removal with a 73% $ClO_2$ recovery. The composition of the scrub solution upon exit was 0.52 grams per minute NaCl (10.8%), 1.23 grams per minute $NaClO_3$ (25.6%) and 3.06 grams per minute $H_2O$ (63.6%). The $ClO_2$ which reacted with the scrub solution (27% loss) was converted to $NaClO_3$, in accordance with the formulae:

$$2NaOH + 2ClO_2 \rightarrow NaClO_2 + NaClO_3 + H_2O$$

$$HOCl + NaClO_2 \rightarrow NaClO_3 + HCl$$

$$HCl + NaOH \rightarrow NaCl + H_2O$$

The invention has been described with respect to specific illustrative embodiments, but it is evident that one of ordinary skill in the art will be able to utilize substitutes and equivalents without departing from the spirit of the invention or the scope of the claims.

What is claimed is:

1. In a process for the production of chlorine dioxide by the reduction of chlorate, the improvement which comprises removing concurrently produced chlorine from a gaseous stream of chlorine and chlorine dioxide by reacting said chlorine with a mixture of sodium chlorate, sodium chloride, and sodium hydroxide at a temperature of from about 50° C. to about 100° C. and at a pH of from about 4 to about 9, wherein said mixture is proportioned so as to provide, upon reaction with the chlorine present, a solution containing sodium chloride and sodium chlorate in a molar ratio of from about 0.7:1 to about 5:1.

2. The process of claim 1 wherein said mixture contains sodium chloride, sodium chlorate, and sodium hydroxide in such proportions that upon reaction with said chlorine, the resultant product contains sodium chloride and sodium chlorate in a molar ratio of from about 1.0:1 to about 1.3:1.

3. The process of claim 2 wherein the sodium chloride is present at above about 75% of the saturation concentration.

4. The process of claim 1, wherein said reaction is conducted at a temperature of from about 70° to about 80° C., at a pH of from about 6 to about 8, with said sodium chloride present at greater than 90% of the saturation concentration, said sodium hydroxide present in approximately stoichiometric amount for reaction with said chlorine, and said sodium chlorate present in such a proportion that upon reaction of said chlorine with said sodium hydroxide the molar ratio of said sodium chloride to said sodium chlorate is from about 1.0:1 to about 1.3:1.

5. A method for the reduction of chlorine content in a gaseous chlorine dioxide stream which comprises reacting the chlorine with a solution of sodium chloride, sodium chlorate, and sodium hydroxide at a temperature of from about 50° C. to about 100° C. and at a pH of from about 4 to about 9, wherein the sodium hydroxide is present in approximately a stoichiometric amount, the sodium chloride concentration is greater than about 75% of saturation, and the ratio of chloride to chlorate in the reaction product is from about 0.7:1 to about 5:1.

6. A method as set forth by claim 5 wherein said sodium chloride is present in a concentration greater than about 90% of saturation.

7. A method as set forth in claim 5 wherein the ratio of sodium chloride to sodium chlorate is selected so as to provide a molar ratio of sodium chloride to sodium chlorate in the reaction product of 1.0:1 to 1.3:1.

* * * * *